United States Patent [19]

Anderson

[11] 4,101,331

[45] Jul. 18, 1978

[54] HALIDE OPTICAL ELEMENTS

[75] Inventor: Rogers H. Anderson, Bloomington, Minn.

[73] Assignee: Honeywell Inc., Minneapolis, Minn.

[21] Appl. No.: 777,869

[22] Filed: Mar. 15, 1977

Related U.S. Application Data

[60] Division of Ser. No. 671,192, Mar. 29, 1976, abandoned, which is a continuation-in-part of Ser. No. 554,290, Feb. 28, 1975, abandoned.

[51] Int. Cl.² ............... C04B 35/00; C04B 11/22
[52] U.S. Cl. ..................... 106/73.1; 423/490; 423/499
[58] Field of Search ............ 423/490, 499; 264/1, 264/65, 66; 106/73.1

[56] References Cited

U.S. PATENT DOCUMENTS

| 3,301,781 | 1/1967 | Rice et al. ............... 264/56 |
|---|---|---|
| 3,359,066 | 12/1967 | Hatch et al. ............... 423/490 |
| 3,365,271 | 1/1968 | Carnoll, Jr. et al. ............... 264/1 |
| 3,933,970 | 1/1976 | Rosette et al. ............... 264/1 X |
| 4,013,796 | 3/1977 | Swinehart et al. ............... 423/490 |

FOREIGN PATENT DOCUMENTS 913,175   12/1962   United Kingdom ............... 423/490

OTHER PUBLICATIONS

Hackh's Chemical Dictionary, 4th Ed., Revised, 1969, p. 401, McGraw-Hill Book Co., N.Y.

*Primary Examiner*—J. Poer
*Attorney, Agent, or Firm*—Omund R. Dahle

[57] ABSTRACT

Fine-grained halide bodies are formed which have comparable optical properties to a single crystal halide body. The halide bodies are formed by press forging while an essentially constant fluid pressure is applied to the halide body.

6 Claims, 8 Drawing Figures

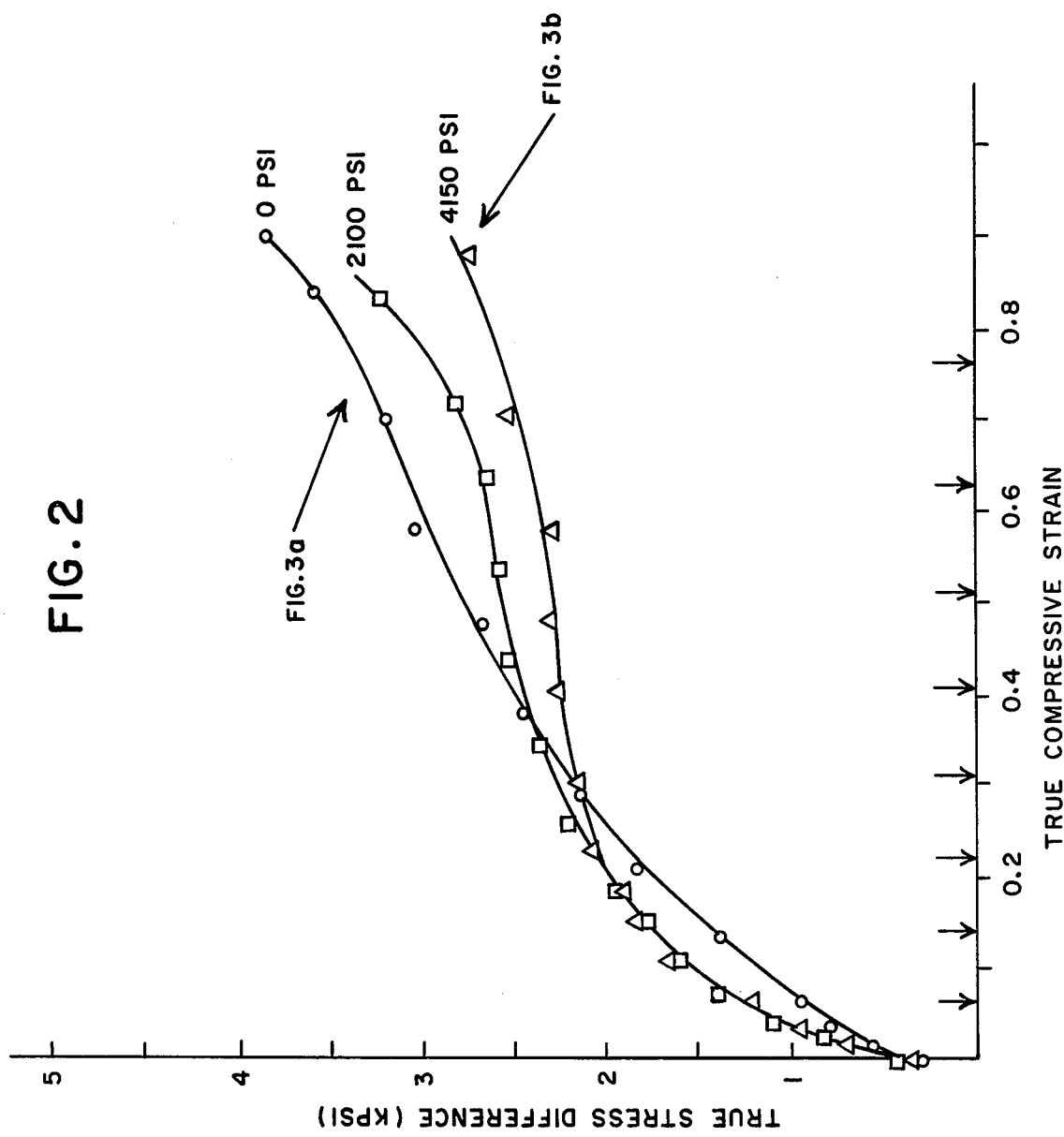

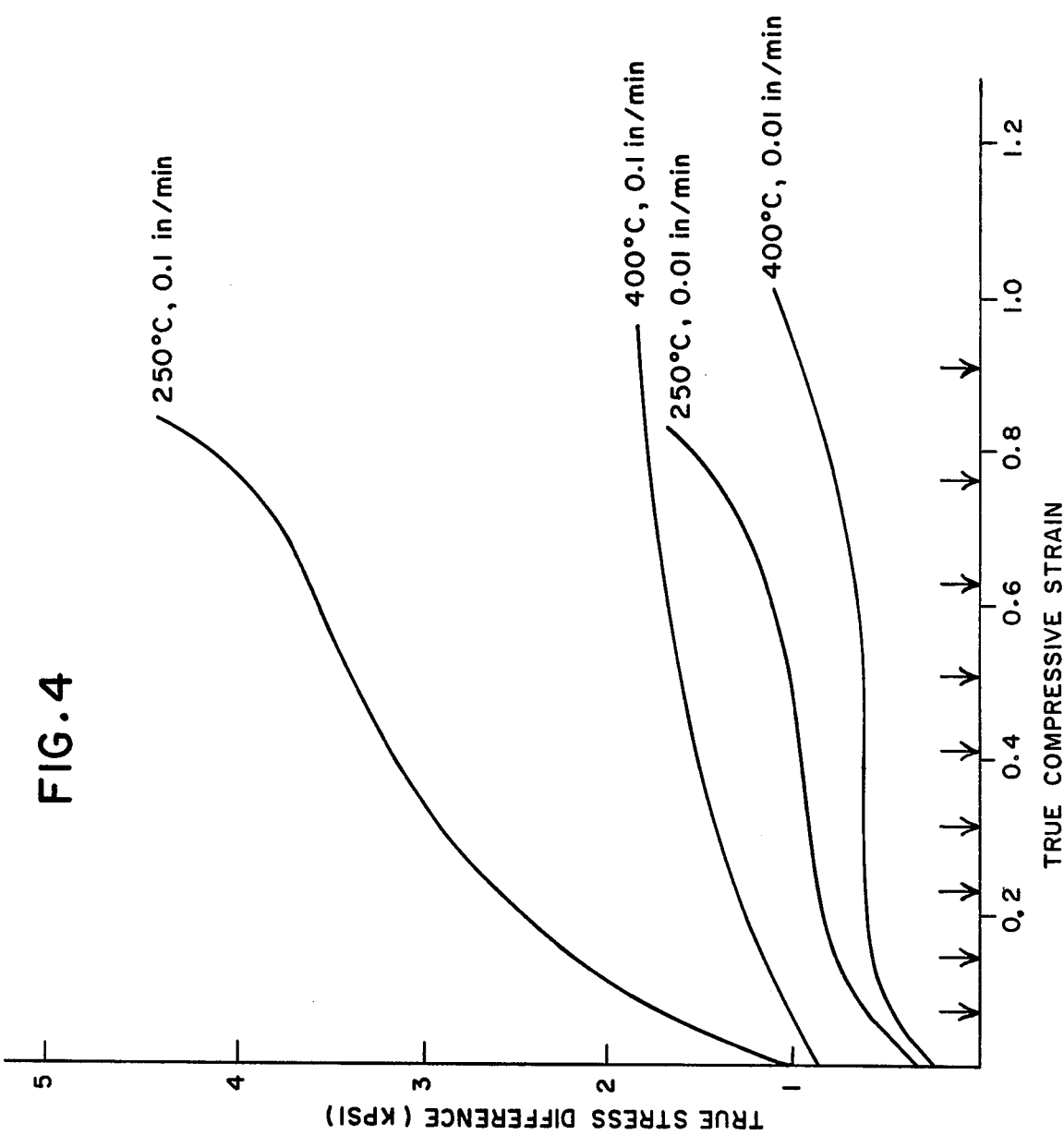

HALIDE OPTICAL ELEMENTS

REFERENCE TO RELATED APPLICATIONS

This is a division, of application Ser. No. 671,192, filed Mar. 29, 1976, which is a continuation-in-part of application Ser. No. 554,290 filed Feb. 28, 1975, both now abandoned, entitled FORMATION OF HALIDE OPTICAL ELEMENTS BY HYDROSTATIC PRESS FORGING and assigned to the same assignee as the present application. The present invention was made under a contract with the Department of Defense.

Reference is made to copending patent applications Ser. No. 445,371 (abandoned) now continuation Ser. No. 619,264, filed Apr. 24, 1975 by R. H. Anderson (abandoned) now continuation Ser. No. 800,675, filed May 26, 1977, Ser. No. 445,394, (abandoned) now continuation Ser. No. 619,264, filed Oct. 3, 1975 by B. G. Koepke and Ser. No. 445,393, (abandoned) now continuation Ser. No. 617,350, filed Sept. 29, 1975 by E. Bernal G. et al now U.S. Pat. 4,031,190. These patent applications are assigned to the same assignee as this application.

BACKGROUND OF THE INVENTION

This invention is concerned with the formation of finegrained halide bodies. In particular, the present invention is concerned with the preparation of high strength halide bodies for use as optical components in infrared systems.

One of the more critical problems encountered in the development of high power infrared lasers is the development of laser windows which are highly transparent to laser radiation at 10.6 microns and at 3 to 5 microns. At the present time, considerable research effort has been devoted to the development of laser windows from the so-called covalent compounds consisting typically of II–VI compounds such as cadmium telluride, zinc telluride, and zinc selenide. The need for improved laser window materials, however, is well known. See, for example, F. Horrigan et al, "Windows for High Power Lasers" Microwaves, page 68 (January, 1969); M. Sparks, "Optical Distortion by Heated Windows in High Power Laser Systems", *J. Appl. Phys.*, 42, 5029 (1971).

The need for improved laser windows is based on the extremely high laser power throughput required and the fact that laser windows constitute structural members. In order to maintain high throughput and minimize adverse effects, the amount of energy transferred to the window must be kept low. Laser beam energy can be transferred to the window in two ways: heating of the window caused by either bulk or surface absorption of the beam, or direct conversion of the beam energy to mechanical energy by brillouin scattering or electrostriction. This energy transfer produces several undesirable effects such as lensing and birefringence, which result in degradation of beam quality and polarization. In extreme cases, severe thermal stresses can be produced in the windows. These stresses which are further aggravated by the fact that the windows are mounted in a cooling clamp, may lead to fracture of the windows.

The low absorption coefficients of the halides make them outstanding candidates for optical components in infrared systems. The alkali halides exhibit low absorption from the near ultraviolet to beyond 10.6 microns, and the alkaline earth halides exhibit low absorption in the 2 to 6 micron region. Furthermore, because the temperature coefficient of the index of refraction and the coefficient of thermal expansion have opposite signs, the two effects tend to compensate optical path changes due to temperature, making these materials useful in applications in which heating by a laser beam is anticipated.

Halide crystals, however, have low yield strengths and are highly susceptible to plastic deformation. These mechanical properties of single crystal halides have limited their use as high power laser windows.

The outstanding transparency of the halide materials makes it very attractive to attempt to overcome their mechanical deficiencies. Halides can be strengthened without altering their optical properties by hot working of single crystals to produce fully dense polycrystalline material.

Fine-grained polygonized halide bodies can be produced by pressing, rolling, or a combination of pressing and rolling. In my previously mentioned patent application, Ser. No. 445,371, I describe a process for forming fine-grained halide bodies at low temperatures by use of a constraint technique. A constraining ring around the halide body applies a compressive hoop stress which inhibits cracking which would otherwise occur during hot working. This technique yields structures which are extremely fine-grained and which can exhibit yield strengths over an order of magnitude higher than the starting single crystal billet. A further advantage of this process is that under certain conditions (temperature, strain rate, initial crystal orientation) the optical properties of the fine-grained billet are identical to those of single crystal material.

While the constraint technique described in my copending patent application has many advantages, it does have a few disadvantages. First, a constraining ring or rings is needed for each billet. The ring may not be reused. Second, the starting halide crystal requires preparation so that it is cylindrical and so that it fits the constraining ring. Third, cracking of billets still occur at low temperatures and very high strain rates even when constraining rings are used. Fourth, when large billets are to be hot-worked, the use of large constraining rings can be cumbersome.

SUMMARY OF THE INVENTION

With the method of the present invention, crack-free halide billets have been formed without the use of a constraining ring and at temperatures which are lower and strain rates which are higher than previously possible even with a constraint ring. Halide bodies are press forged while a fluid pressure is applied to the halide body.

BRIEF DESCRIPTION OF THE DRAWING

FIG. 2 shows stress—strain curves for hot pressed KCl billets pressed at 150° C to over 70% reduction with essentially no oil pressure, and with oil pressures of approximately 2100 psi and 4100 psi.

FIG. 4 shows true stress—true strain curves for 99 mole % KCl — 1 mole % RbCl billets forged by the method of the present invention.

DETAILED DESCRIPTION OF THE PREFERRED EMBODIMENTS

Hydrostatic Press Forging Apparatus

The present invention is a press forging technique for forming crack-free, high strength fine grained halide optical elements. The halide billet is compressed between two platens as in conventional press forging. In the present invention, however, the press forging is performed in a closed chamber filled with pressurized fluid. For this reason, the present invention is termed "hydrostatic press forging".

Figure 1:
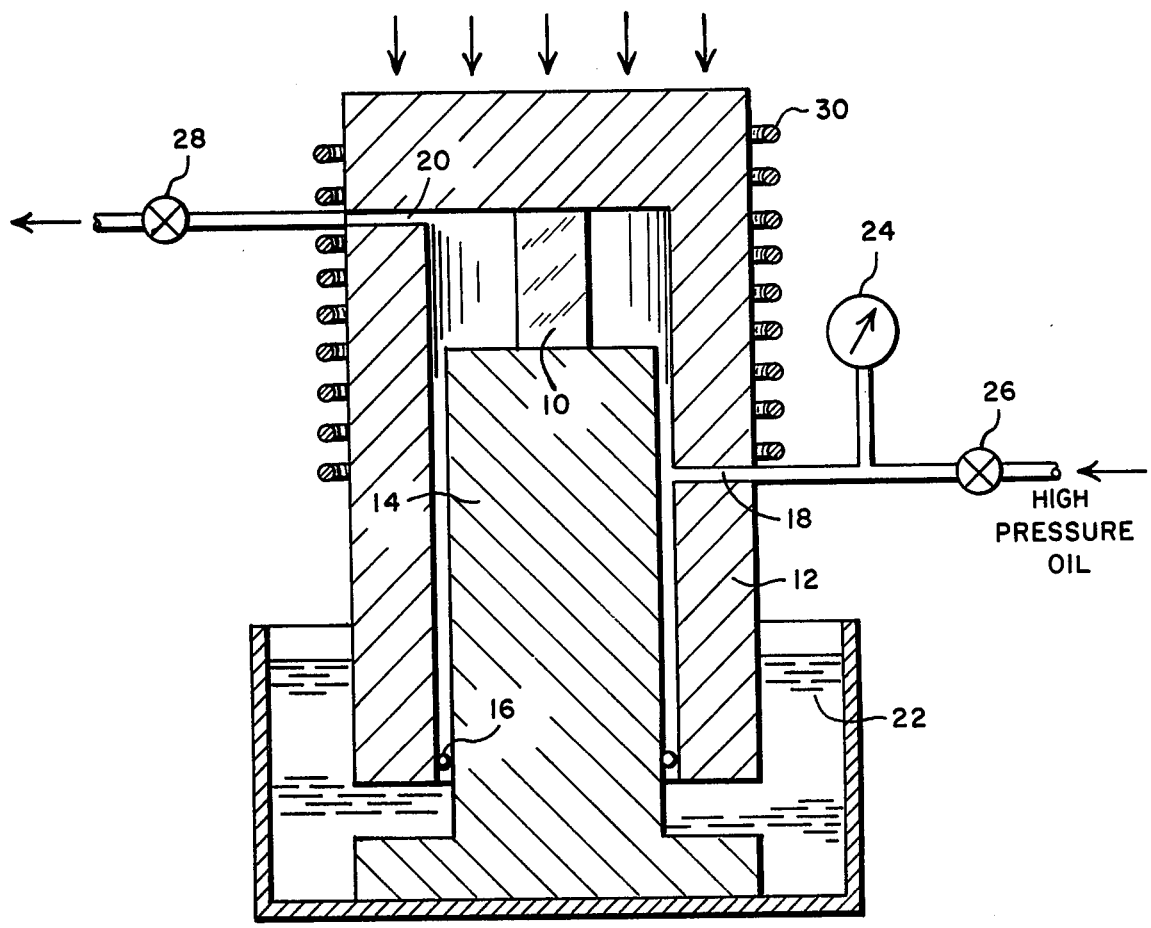
FIG. 1 shows hydrostatic press forging apparatus for use in the present invention.

FIG. 1 schematically shows the hydrostatic press forging apparatus used to form halide optical elements. Halide billet 10 is press forged between surfaces of chamber 12 and piston 14. The lower end of chamber 12 and piston 14 are very close fitting to maintain O-ring under high pressure. A high pressure fluid enters the chamber through port 18. Vent 20 is also provided in the chamber. One end of chamber 12 is heated by heater coil 30, while the other end is cooled by water 22. Pressure indicator 24 indicates the pressure of the fluid within the chamber, and valves 26 and 28 may be controlled to increase or decrease the pressure within the chamber.

Chamber 12 is preferably made from a low heat conductivity metal like stainless steel. Chamber 12 is as long as possible since one end will be heated and the other cooled.

Water 22 cools the lower ends of both chamber 12 and piston 14. By maintaining both chamber 12 and piston 14 at the same temperature, welding of piston 14 and chamber 12 and extrusion of O-ring 16 are prevented.

The fluid which is used with the present invention must not chemically react with the halide billet and must be reasonably fluid at the temperatures at which press forging will occur. Number 702 silicone oil has been found to be particularly advantageous for hydrostatic press forging of both alkali halides and alkaline earth halides.

The hydrostatic press forging of alkali halides is performed in the following manner. Piston 14 is placed in water 22, and a shim (not shown) is placed on the top surface of piston 14. The halide billet 10 is then placed on top of the ship, and another shim (not shown) is placed on top of the billet. Chamber 12 is then lowered over the piston until O-ring 16 seals at the bottom.

Valves 26 and 28 are then opened and the fluid is pumped into the chamber to displace air. When the fluid appears at the vent, valve 28 is closed. The fluid pressure within the chamber is then increased to its predetermined value.

Chamber 12 is then heated by heater 30. When the desired temperature for press forging is reached and the soak time is completed, the pressing is started.

The fluid pressure within chamber 12 during pressing is monitored by gauge 24. Valve 28 is controlled so as to maintain the predetermined fluid pressure.

It has been found to be particularly advantageous to periodically relax the compressive load on the crystal during forging. This periodic unloading or relaxation of the load appears to have beneficial results in minimizing cracking.

After the desired deformation of the billet has been achieved, the load is relaxed slightly while the fluid pressure is maintained at its predetermined value. The heat from heater 20 and the pressure from the fluid can be maintained as long as desired. This allows an in situ anneal of billet 10, if desired.

In one embodiment of the present invention, the billet is forged between two platens in a closed chamber similar to FIG. 1 and filled with heated, pressurized silicone oil. During a run the oil pressure is maintained constant. The chamber is capable of being operated at oil pressures up to 5,000 psi and at temperatures up to 500° C. Forging loads are applied by a 200,000 lb. Tinius Olsen hydraulic testing machine which offers the added feature of allowing the load and ram travel to be continuously monitored during a run.

MATERIALS AND FORGING PARAMETERS

Crystals of pure KCl, KCl-KBr and KCl-RbCl alloys, and $CaF_2$ have been forged by this technique. The KCl crystals were 1.5 inches in diameter and 1.5 inches high. The KCl-base alloy crystals and the $CaF_2$ crystals were 1 inch in diameter and 1 inch high. The alkali halides were forged along <100> and the $CaF_2$ along <111>. Most runs were made at oil pressures of 4100 to 4500 psi at constant ram speeds of 0.01 inch/min. and 0.1 inch/min.

Prior to forging the KCl crystals were annealed 2 hrs. at 700° C and air cooled. The alloy crystals were annealed 8 hrs. at 550° C and furnace cooled. The $CaF_2$ crystals were forged in the as-received condition from the vendor (Optovac).

CHARACTERIZATION

The mechanical properties of the forged crystals were determined by 3-point bend testing (0.75 inch span) of bars cut from the billets with a wire saw moistened with water. The bars were then lapped to shape on wet silk and immersion polished in water just prior to testing. Three bars were cut from each billet. Microstructural observations were made on the broken alkali halide bars near the fracture by polishing in a mixture of alcohol and water on a felt cloth and immersion etching in a mixture of acetic and formic acids. The absorption coefficient $\beta$ at 10.6$\mu$m was determined before and after forging on a number of the samples using a laser calorimeter.

HYDROSTATIC PRESS FORGING OF KCl

In an effort to determine how the superimposed hydrostatic oil pressure affected the deformation behavior of KCl crystals during forging, crystals were forged in oil to 60% reduction in height (true strain = − 0.92) at oil pressures of 0, 2100 and 4100 psi. All runs were made at 150° C at a constant ram speed of 0.01 inch/min. In all runs the axial load was released after every 0.1 inch of ram travel while maintaining the oil pressure.

The stress-strain behavior of these crystals during forging is shown in FIG. 2. The stress shown in FIG. 2 is the difference between the total axial stress on the billet and the oil pressure. The arrows at the bottom of the plot indicate where the load was momentarily relaxed during forging.

Figure 3A:
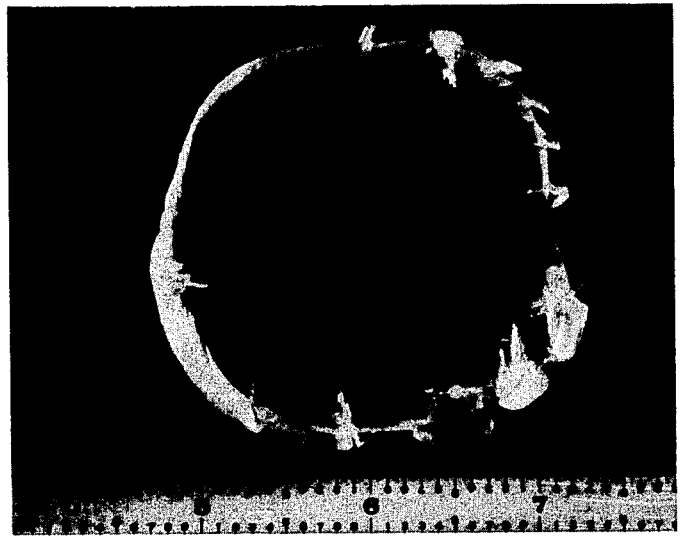
FIGS. 3*a* and 3*b* are photographs of the hot pressed KCl billets described in FIG. 2.
Figure 3B:
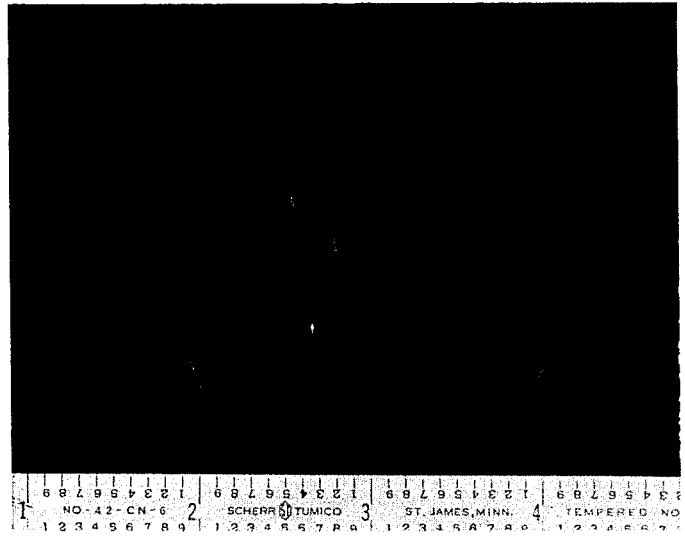

FIGS. 3a and 3b are photographs of the billets forged in unpressurized oil and in oil pressurized to 4100 psi, respectively. The photographs clearly indicate that cracking is eliminated by forging in pressurized oil. The stress-strain curves show two types of behavior. At low strains the flow stresses of the crystals compressed in pressurized oil exceed that of the crystal compressed in unpressurized oil. At high strains the flow stress decreases as the oil pressure increases.

The ability to forge alkali halides to large reductions without cracking the billets by this technique is due to a number of factors. First, a superimposed hydrostatic pressure suppresses tensile fracture. This effect has been used for quite some time in tests of the deformation and fracture characteristics of brittle materials such as rocks. P. W. Bridgman, *Studies in Large Plastic Flow and Fracture*, McGraw-Hill, New York (1952), P. 118; L. Obert, *Fracture: an Advanced Treatise*, Vol. VII, Academic Press, New York, (1972), P. 106.

Second, pressurizing the oil enhances the lubrication at the outer edge of the platen-billet interface. W. A. Backofen, *Deformation Processing*, p. 170 (1972), has shown that during press forging the lubricant in this region is easily ejected by the forging stresses. The resulting increased frictional forces cause barreling and edge cracking. Pressurizing the oil minimizes this effect. Backofen also points out that the lubrication can be improved by periodically unloading the press during forging. Periodic unloading during forging has been used to advantage in the present invention. The increased lubrication accounts in part for the lower forging stresses at higher strains.

Third, the superimposed hydrostatic pressure may, in itself, account for some of the observed behavior. Aladag et al, *Phil. Mag.*, 21, 469 (1970), have shown that the flow stresses of NaCl crystals deformed at room temperature under highly pressurized oil (i.e. 7–10 Kbar) increase with oil pressure at low strains and decrease with pressure at higher strains similar to the behavior shown in FIG. 2. The results are interpreted in part in terms of the effect of pressure on the onset of extensive cross slip in the deforming crystals. Direct comparison with their data is difficult, however, since the pressures used were much higher than those used in the hot pressing described above.

HYDROSTATIC PRESS FORGING OF KCl-BASE ALLOYS

A number of KCl-base alloy crystals have also been forged by the hydrostatic technique. 99 mole % KCl — 1 mole % RbCl and 95 mole % KCl — 5 mole % RbCl crystals have been forged at constant ram speeds of 0.01 and 0.1 inch/min and 95 mole % KCl — 5 mole % KBr crystals have been forged at a ram speed of 0.01 inch/min. In all cases the forging temperatures were 250, 300, and 400° C and the oil pressure was 4100 or 4500 psi. At the temperatues and strain rates employed, in all but two instances, the forged billets were crack free. The two billets that cracked were forged at a constant ram speed without periodically relaxing the load.

The stress-strain behavior during forging for four 99 mole % KCl — 1 mole % RbCl crystals forged at two rates and two temperatures is shown in FIG. 4. Increasing the forging temperature and decreasing the strain rates results in lower forging stresses. The strain rate dependence of the forging stress is greater at the lower forging temperature.

The properties of hydrostatic press forged KCl-base alloys are listed in Table 1. Total reductions varied from about 50 to 75 percent and the final strain rates ranged from about 0.02 to 0.18 min$^{-1}$. The yield strengths of the 1 mole % RbCl alloys forged at 250° C were around 3,000 psi and those forged at 400° C were around 2,000 psi. The yield strengths of the 5 mole % RbCl alloys were around 4,000 psi. The grain sizes varied accordingly and ranged from 3 to 13μm. It is interesting to note that in every case the yield strength dropped with an increase in strain rate at any single forging temperature. The explanation for this behavior is not clear but may be due to an inverse effect of the strain rate on the post forging recovery kinetics. The highest strength billet on Table 1 (No. 228) was forged the last 0.030 inch at an extremely high strain rate. The resulting work hardening led to a very high strength but still crack free sample. The 5 mole % KBr billets were stronger than the others with yield strengths ranging from 4700 to over 7500 psi. The strongest billets, however, cracked during forging and the resulting test bars fractured without yielding. Forging No. 203 was annealed 12 hrs. at 300° C prior to testing and did exhibit some ductility. These results again show the advisability of periodically relaxing the load during forging.

TABLE I

| Alloy | No. | Temp. (° C) | Oil Press (psi) | Ram Speed (in/min) | % Red. | Final Strain Rate (min$^{-1}$) | Yield Stress* (psi) | Fracture Stress (psi) | Grain Size (μm) | $\beta$ $10^{-3}$cm$^{-1}$ | Comments |
|---|---|---|---|---|---|---|---|---|---|---|---|
| KCl-1 Mole % RbCl | 237 | 250 | 4500 | .01 | 74 | .027 | 3460 | 4930 | 6 | 1.6 | |
| | 236 | 250 | 4500 | .1 | 57 | .15 | 2400 | 5190 | 4 | | |
| | 228 | 300 | 4500 | .01 | 76 | see comments | 8860 | 11,785 | 7 | | Last 0.030 inch of ram travel at very high rate |
| | 235 | 300 | 4500 | .1 | 62 | .17 | 3560 | 5660 | 4 | | |
| | 250 | 400 | 4100 | .01 | 63 | .022 | 2290 | 4120 | 13 | 2.9 | |
| | 246 | 400 | 4100 | .1 | 62 | .22 | 1650 | 3040 | 8 | | |
| KCl-5 Mole % RbCl | 229 | 250 | 4500 | .01 | 60 | .017 | 4670 | 6300 | 4 | | |
| | 230 | 250 | 4500 | .1 | 63 | .18 | 3940 | 5900 | 3 | | |
| | 232 | 300 | 4500 | .01 | 62 | .017 | 4070 | 4070 | 4 | | |
| | 231 | 300 | 4500 | .1 | 54 | .14 | 3600 | 5510 | 4 | | |
| | 234 | 400 | 4500 | .01 | 63 | .021 | 4030 | 4030 | 7 | 1.6 | |
| KCl-5 Mole % KBr | 216 | 250 | 4500 | .01 | 67 | .03 | 6370 | 6640 | 5 | | |
| | 252 | 250 | 4100 | .01 | 55 | .02 | 5840 | 7750 | 6 | | |
| | 200** | 250 | 4500 | .01 | 69 | .023 | 7830 | 7830 | <2 | | Cracked |
| | 202** | 300 | 4500 | .01 | 71 | .023 | 7390 | 7390 | 5 | | Cracked |
| | 203** | 300 | 4500 | .01 | 72 | .025 | 6100 | 7990 | 5 | | Annealed 12 hrs. at 300° C after forging |

TABLE I-continued

| Alloy | No. | Temp. (° C) | Oil Press (psi) | Ram Speed (in/min) | % Red. | Final Strain Rate (min$^{-1}$) | Yield Stress* (psi) | Fracture Stress (psi) | Grain Size (μm) | $10^{-3}$ $\overset{\beta}{\text{cm}^{-1}}$ | Comments |
|---|---|---|---|---|---|---|---|---|---|---|---|
|  | 207** | 400 | 4500 | .01 | 69 | .023 | 4730 | 5030 | 5 | 5.5 |  |

*3-point bend, proportional limit.
**Load not relaxed during forging.

A reasonable value for the yield strength of crack free KCl — 5 mole % KBr billets forged at 250° C is 6,000 psi. This strength level has been observed by others for the same alloy forged with and without constraints. The billets forged to this strength level without constraints, however, showed some cracking, S. A. Kulin et al. Proc. Third Conf. on High Power Infrared Laser Window Materials, C. A. Pitha, A. Armington and H. Posen ed., Air Force Cambridge Research Laboratories, AFCRL-TR-74-0085, p. 637 (1974).

Absorption coefficients at 10.6μ have been measured on a number of these forgings and are given in the last column in Table 1. The absorption coefficients are essentially unchanged from the values of the starting crystals.

From the above, a number of points can be made. First, KCl-base alloy crystals that have the required strength for laser window applications can be forged by the hydrostatic press forging technique. Second, the technique is superior to constrained forging in that it is virtually 100% effective in eliminating cracking during forging. Third, the absorption coefficient at 10.6μ does not increase above that of the starting crystal. Fourth, the technique appears amenable to scale-up at least for the production of intermediate sized forgings. For example, assuming a flow stress in the deforming billet of 2,000 psi, a 17 inch diameter forging can be made under a 2,000 psi oil pressure in a 500 ton press. If the oil pressure is raised to 4,000 psi, the same press could forge a 14 inch diameter billet.

HYDROSTATIC PRESS FORGING OF ALKALINE EARTH FLUORIDES

The fluorides of calcium, barium and strontium are potential candidates for use as optical components in the 2 - 6 μm region of the infrared spectrum. Optical components presently made from these materials are typically single crystals or coarse-grained (grain sizes of seveal millimeters) forgings or castings. H. Winston, R. Pastor, R. Turk, A. I Brunstein, and R. F. School, "Fluoride Window Materials for Use as Laser Windows in the 2 - 6 μm Spectral Region", Final Report, May, 1975, AFML-TR-75-73; R. T. Newberg and J. Pappis, "The Fabrication of Fluoride Laser Windows by Fusion Casting", Proceedings of the Fifth Conference on Laser Window Materials, 1976. In this condition, these materials have low resistance to fracture since there are few grain boundaries or randomly oriented grains to impede crack propogation. Efforts to reduce the grain size by deformation to increase the crack propogation energy, as has been done with the alkali halides, have been largely unsuccessful in the past. In order to produce crackfree forgings, other workers have elevated the forging temperature above the recrystallation temperature (approximately 800° C). The resulting grain size of these forgings has become several millimeters or larger.

Using the method of the present invention, crack-free forging of calcium fluoride, barium fluoride, strontium fluoride, and alloys of these materials can be made at temperatures below the recrystallation temperature. By forging at temperatures below the recrystallation temperature, it is possible to polygonize the structure and produce a fine-grained structure (i.e. grain sizes less than about 20μm). Although other workers have stated that it is not possible to produce crack-free, fine-grained fully dense alkaline earth fluoride optical elements, the method of the present invention has, in fact, produced these optical elements.

The alkaline earth fluorides are extremely sensitive to either physical or thermal shock. The method of the present invention minimizes the effects of physical or thermal shock while producing crack-free, fine-grained optical elements from a single crystal starting material.

In the preferred embodiments, the single crystal is first polished to remove surface cracks. This polishing may be both physical and chemical polishing. The crystal is then placed in a pressure chamber similar to that shown in FIG. 1. To improve the lubrication of the top and bottom surfaces of the crystal, Teflon shims may be used. This is particularly advantageous when temperatures in the neighborhood of 500° are used for forging, since the crystal has very low ductility at these temperatures.

After the crystal has been placed in the chamber, an isostatic or hydrostatic oil pressure of approximately 4,000 psi is imposed. This pressure is maintained throughout the process.

The temperature of the forging chamber is then raised to the desired forging temperature. In the case of the alkaline earth fluorides, the desired forging temperature is between about 500° C and about 700° C. The maximum temperature is below the recrystallation temperature of the material. The temperature and pressure are maintained in the chamber until thermal equilibrium is attained.

The crystal is then deformed at a suitable strain rate until the desired deformation is reached. The temperature and pressure are held for approximately one hour to allow relaxation of strain in the billet. The temperature is then held constant while the constraining oil pressure is gradually reduced. The chamber is then allowed to cool to room temperature and the forging is removed. The resulting optical element has a fine-grained polygonized structure. Preferably, the fine-grained structure has grain sizes on the order of 3 to 7μm. The grain size can be increased by reheating the forged billet after forging.

In one successful embodiment of the present invention, the single crystal material was calcium fluoride (CaF$_2$). The single crystal was placed in the pressure chamber with Teflon shims on the top and bottom surfaces. A silicone fluid (Dow Corning 200 fluid 0.65 CS) filled the chamber and applied an isostatic pressure of approximately 4,100 psi. The forging operation was performed at 500° C with a strain rate of 0.6% true strain per minute. The calcium fluoride single crystals were oriented <111> and were one inch in diameter by one inch high.

Using the method of the present invention, crack-free calcium fluoride optical elements have been formed with deformations of 28, 45 and 60%. The resulting microstructure of the forging was polygonized, since no individual grains were detected even at high magnification.

The 28% deformed sample revealed a banded structure with alternate areas of strained and unstrained material. With 45% deformation, much more strain-induced polygonization appeared, while the 60% deformed sample exhibited the most uniform deformation structure. Preliminary data from three point bend tests showed fracture strengths of 9,000 to 14,000 psi. No yielding was observed and it appeared that all fractures were initiated from surface flaws in the test specimens.

Tests were also performed to illustrate recrystallation produced by heating after forging. A sample deformed to 28% was heated for two hours at 945° C. This produced very rapid grain growth in the strained regions. A sample deformed to 45% was heated to 850° C for 0.5 hours. Microscopic inspection of the sample showed that the first recrystallized grains were appearing. Finally, a sample deformed 60% was heated for 0.5 hours at 800° C and the first grains were appearing with the heat treatment. As would be expected, the recrystallation temperature was related to the strain energy retained during forging.

The method of the present invention is the only known method for producing fine-grained, alkaline earth fluorides. These optical elements are of particular importance for optical systems operating in the 2 to 6 μm wavelength region.

POST-FORMING ANNEALING

Alkali halide laser window blanks generally will not be used in the as-forged condition. Unless worked at very high temperatures the billets generally contain some residual stresses which may cause cracking during subsequent handling and stress birefringence. Residual stresses are also considered to be the major driving force for low temperature abnormal grain growth in hot worked alkali halides. Residual stresses can be minimized by both low stress (e.g., high temperature and low strain rate) forging operations and by post forming (i.e. stress relief) annealing treatments. Since the strengths of forged alkali halides decrease as the working temperatures are increased, it is advantageous to decrease the residual stresses in billets forged at moderate temperatures by annealing. In many cases the yield strength is not significantly altered by a stress relief anneal.

An important advantage of the present invention is that the post-forming anneal can be performed in situ. Hydrostatic pressure can be applied, if needed, during the anneal.

FABRICATION OF HALIDE LENSES

The hydrostatic press forging technique may also be used to form halide lenses for applications in infrared optical systems. FIG. 4 schematically shows the hydrostatic press forging apparatus being used to form halide lenses. The equipment is similar to that shown in FIG. 1, and similar numerals are used to describe similar elements.

Figure 5:
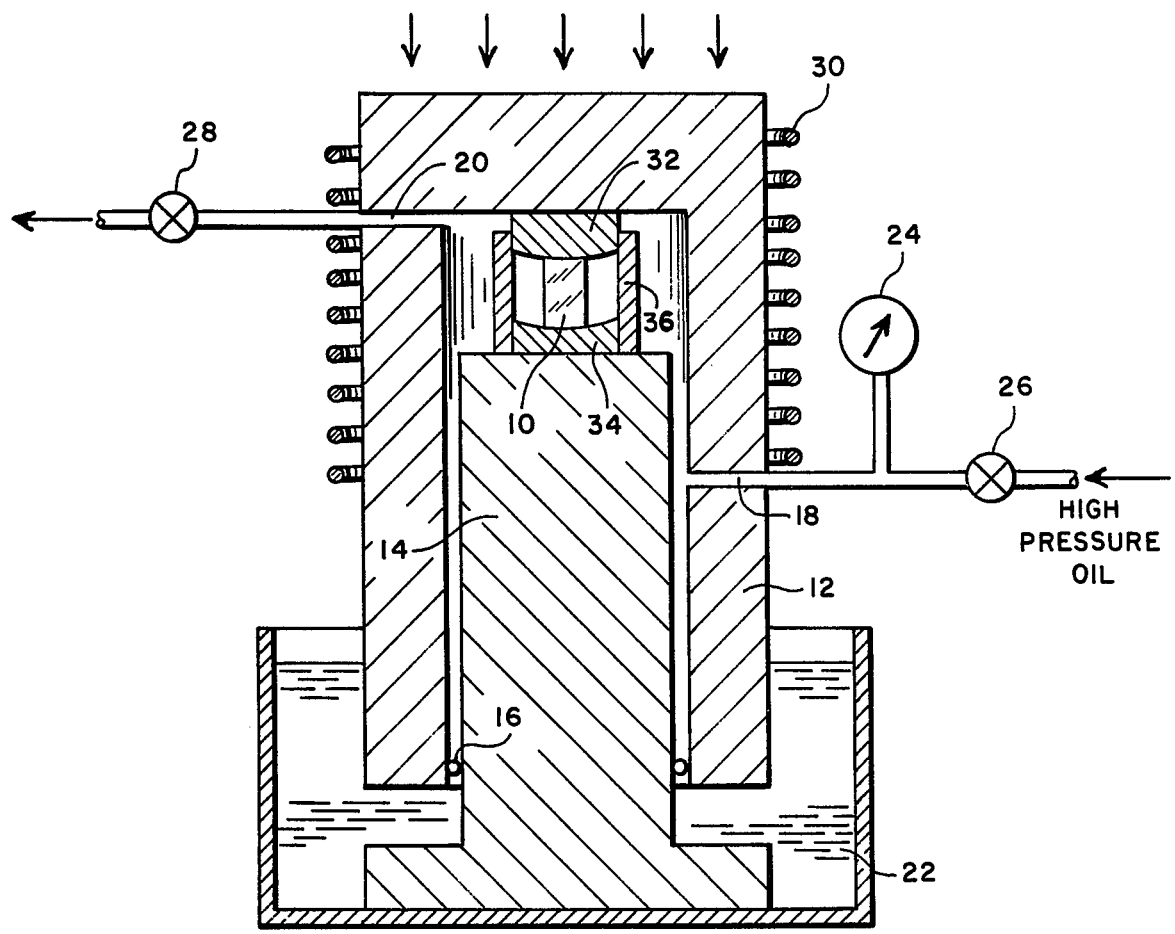
FIG. 5 shows closed die forging apparatus in which a hydrostatic pressure is applied.

In FIG. 5, the halide crystal 10 (usually a right circular cylinder) is placed between two die inserts 32 and 34 contained in sleeve 36. The crystal and die are then placed in the hydrostatic press forging apparatus, with the two die inserts contacting the platen of the press.

As in FIG. 1, the halide billet is surrounded with pressurized oil during the forging process. The pressurized oil exerts a hydrostatic pressure on the deforming billet which both inhibits the formation of cracks and enhances lubrication at the die-billet interface.

In a typical forging of KCl lenses, the fluid pressure is about 4,000 psi, and is maintained constant by an air pump and a high pressure relief valve. The ram is moved down at a constant rate of about 0.01 inch per minute. During forging, the load on the die is periodically relaxed to enhance lubrication by replenishing the oil at the die-billet interface. After forging is complete, the ram is backed off slightly and the die assembly is cooled under the 4,000 psi hydrostatic pressure to ambient temperature.

Figure 6:
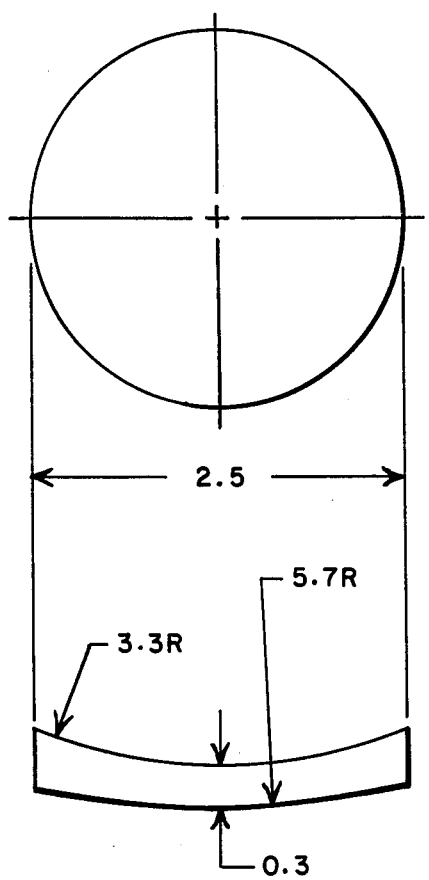
FIG. 6 shows the desired dimensions of a lens.

In one successful embodiment, stainless steel dies are used. The desire dimensions of the resulting lens are shown in FIG. 6. The diameter of the lens is 2.5 inches, the thickness at the center of the lens is 0.3 inches, the radius of curvature of the inner surface is 3.3 inches, and the radius of curvature of the outer surface is 5.7 inches.

Figure 7:
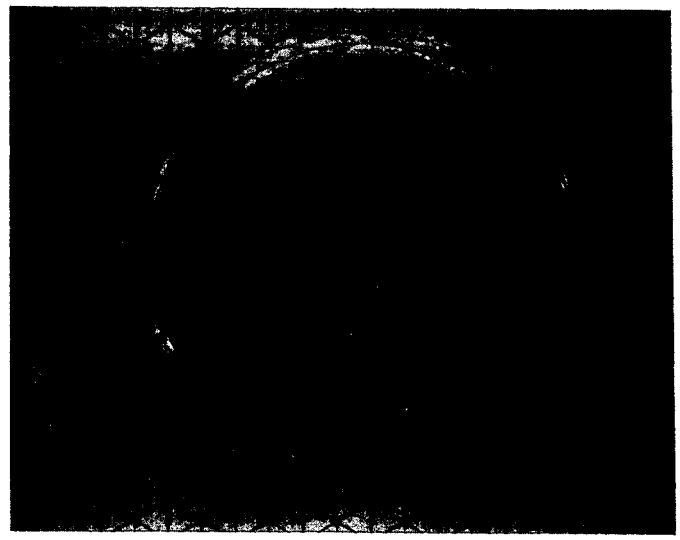
FIG. 7 is a photograph of a halide lens of the dimensions shown in FIG. 6 which was formed by the apparatus of FIG. 5.

FIG. 7 shows a KCl lens forged at 400° C with a 4,000 psi hydrostatic pressure and a ram speed of 0.01 in. per min. The KCl crystal used to form the lens of FIG. 6 was a right circular cylinder having a diameter of 1½ inches and a height of 1 inch. After press forging, the KCl lens had dimensions which were essentially those shown in FIG. 6.

The hydrostatic press forging of halide lenses has shown that both KCl and KCl-based alloy crystals have sufficient plasticity to conform to die shapes like those required for the lens of FIG. 6. Forging of lenses has been achieved at temperatures as low as 200° C, and, in fact, the surface finish is better for lenses forged at the lower temperatues. The hydrostatic press forging technique, therefore, provides a low cost technique for making infrared lenses.

CONCLUSION

The present invention has several advantages. First, it allows crack-free halide billets to be formed at lower temperatures and higher strain rates than were previously possible. Second, no constraint ring is needed. Third, the starting crystal requires no special preparation prior to press forging other than possible polishing. It need not have a cylindrical shape, as is generally required in the constraint ring process. Fourth, the process is amenable to scale up. Fifth, a heat treatment can be performed in situ after press forging and may be performed while a fluid pressure is applied. Sixth, the process may be used to form low-cost halide lenses for infrared optical systems.

The present invention has been described with reference to a series of preferred embodiments. Workers skilled in the art, however, will recognize that changes in form and detail can be made without departing from the spirit and scope of the present invention.

The embodiments of the invention in which an exclusive property or right is claimed are defined as follows:

1. An infrared transparent optical element comprising a crack-free, fully-dense alkaline earth fluoride body having a fine-grained crystalline structure throughout and having a grain size range of less than about 20μm.

2. The infrared transparent optical element of claim 1 wherein the alkaline earth fluoride body is of the group consisting of calcium fluoride, barium fluoride, strontium fluoride, and alloys thereof.

3. The infrared transparent optical element of claim 2 wherein the body has grain sizes less than about 20μm.

4. The infrared transparent optical element of claim 3 wherein the body has grain sizes between about 3μm and about 7μm.

5. The infrared transparent optical element of claim 1 wherein the body has a polygonized crystal structure.

6. The element according to claim 1 wherein the forging is along the <111> axis.

* * * * *